Nov. 1, 1960 J. J. DAVIDSON ET AL 2,958,770
ALERT RADIO SIGNAL RECEIVER
Filed Jan. 9, 1958
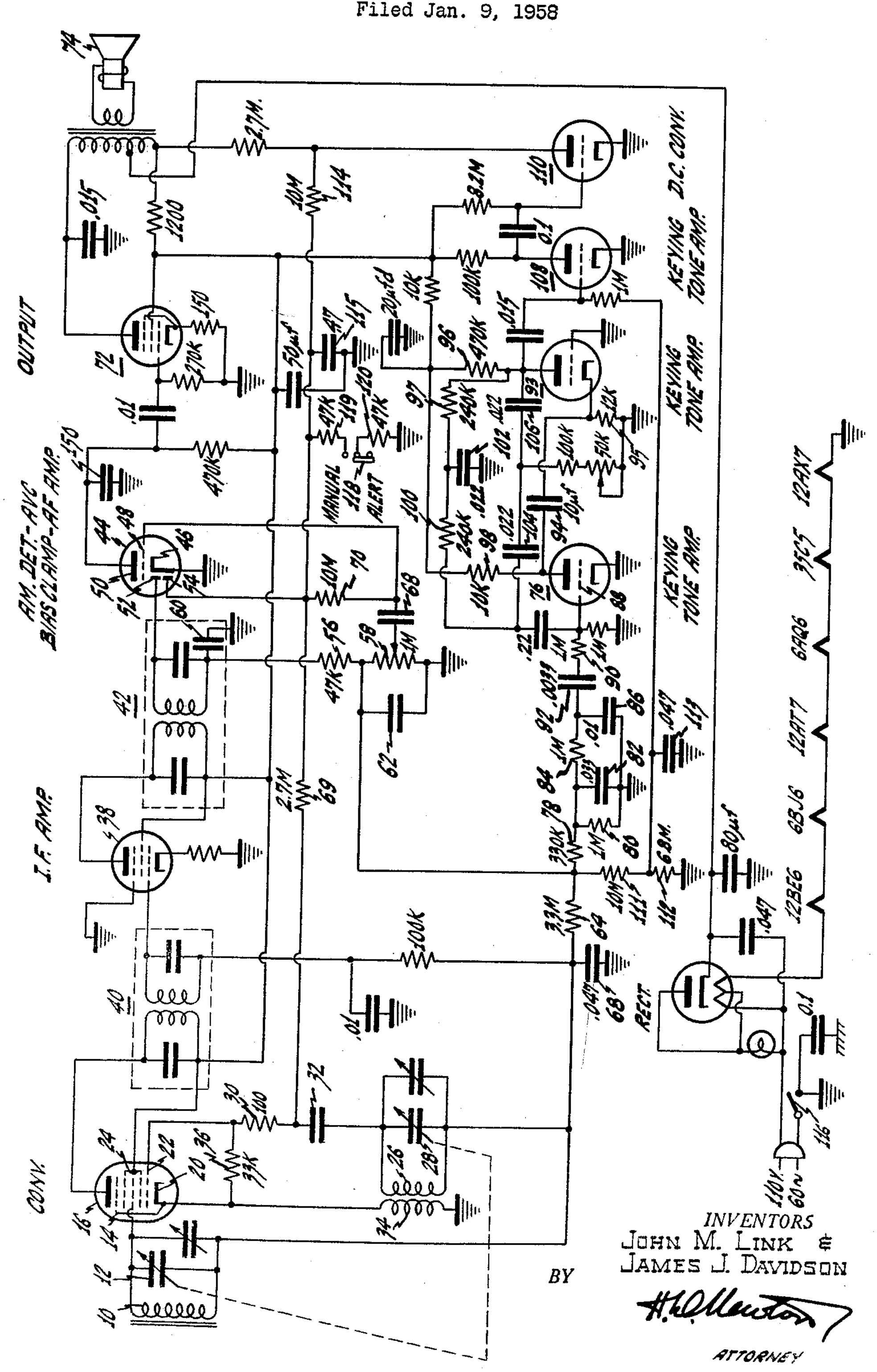
INVENTORS
JOHN M. LINK &
JAMES J. DAVIDSON
BY
ATTORNEY 2,958,770

ALERT RADIO SIGNAL RECEIVER

James J. Davidson, Audubon, and John M. Link, Haddon Heights, N.J., assignors to Radio Corporation of America, a corporation of Delaware Filed Jan. 9, 1958, Ser. No. 708,041
3 Claims. (Cl. 250—20)

The present invention relates generally to remote control systems, and more particularly to a remote control system wherein the operation of a reproducer of a "stand-by" radio receiver may be controlled from a remote point by transmitting a carrier wave modulated by normal modulation frequencies or special control modulation frequencies.

In times of national emergency, it may be of vital importance to immediately alert the people of the nation, or to a certain class of people, such as air raid wardens, of an impending condition or action, and issue necessary instructions to them. Likewise, it would be highly desirable to be able to immediately receive news bulletins of importance or interest to the public without the necessity of continuously monitoring a receiver. One type of broadcasting system previously proposed for accomplishing the foregoing, utilizes a "stand-by" or "alert" receiver which is conditioned to reproduce a desired transmission upon the reception of a control signal which is preferably, though not necessarily, generated at the broadcast station which is to exercise control. If desired, an auxiliary special carrier, modulated or unmodulated, may be used to provide the desired control.

Alert receivers heretofore provided for use with the aforementioned broadcasting systems are generally unsuited for widespread commercial distribution and sale, the primary reason being that most of the circuits proposed are so expensive as to find only a limited market. Furthermore, the known circuits are generally critical to adjust for proper operation in response to the desired control signal, and are subject to undesired actuation by spurious signals.

Accordingly, it is an object of the present invention to provide an improved alert or stand-by receiver.

It is a further object of this invention to provide a relatively simple and inexpensive stand-by or alert receiving system which provides dependable and trouble-free operation.

In accordance with the invention, the control electrode of one of the signal translating stages in the signal channel of a receiver is connected to a point on a voltage divider which is at a potential during normal signal transmission intervals to maintain the signal translating stage cut-off, and thereby block the signal channel. Upon reception of a predetermined control or keying signal, the potential across the voltage divider is redistributed in a manner that the potential applied to the control electrode of the signal translating stage serves to unblock the signal channel. If desired, a unidirectionally conductive device may be connected at the aforementioned point on the voltage divider network in a manner to limit the potential developed at this point, whereby the signal translating stage may not be driven into an operating region which would produce distortion.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

The sole figure of the drawings comprises a schematic circuit diagram of a stand-by or alert receiver embodying the invention. The receiver illustrated is designed for the reception of radio signals in the broadcast band extending from 540 to 1600 k.c. (kilocycles), but could be designed for operation in any desired frequency band. The receiver includes a signal selection circuit comprising a ferrite loop antenna 10 which is tuned to the frequency of a desired signal in the broadcast band by a variable tuning capacitor 12. The selected signals are applied to the signal input grid 14 of a pentagrid converter tube 16 and are heterodyned with a locally generated oscillator wave to a corresponding signal of intermediate frequency.

The oscillator section for the converter tube 16 includes the cathode 20, control grid 22 and screen grid 24 which operates as the oscillator anode electrode. The oscillator circuit is tuned to the desired frequency by a parallel resonant circuit including a coil 26 and variable tuning capacitor 28 which is ganged for unicontrol operation with the tuning capacitor 12 in the signal selection circuit. As is well known, the oscillator frequency is selected to differ from the desired signal frequency by an amount equal to the intermediate frequency of the receiver. The oscillator tuning circuit is connected between ground and the control grid 22 of the converter tube 16 by way of a resistor 30 and a capacitor 32. A winding 34 which is coupled to the coil 26 in the oscillator tuning circuit connects the cathode 20 to ground to provide the necessary feedback to sustain oscillation in the converter. A resistor 36 is connected between the control grid 22 and the cathode 20 to provide a D.C. return path between these electrodes, and in the normal operation of the converter the grid current through the resistor 36 produces a bias of about −10 volts on the control grid 22.

The intermediate beat frequency signal resulting from the heterodyning of the received radio frequency and oscillator signals is coupled from the converter tube 16 to a conventional intermediate frequency amplifier 38 by a double-tuned intermediate frequency transformer 40. Intermediate frequency signals applied to the amplifier 38 are amplified and coupled through a second intermediate frequency transformer 42 to the second detector for the receiver.

The second detector stage comprises a diode portion of a duo-diode, triode tube 44 having a common cathode 46, control grid 48 and anode 50 as well as a pair of auxiliary anodes 52 and 54 for the diode portions of the tube. If desired, separate tubes could be provided. The intermediate frequency signals developed across the tuned secondary circuit of the intermediate frequency transformer 42 are applied between the anode 52 and cathode 46 of the second detector by way of a pair of bypass capacitors 60 and 62. The direct current path for the detector includes a series circuit including the secondary of the I.F. transformer 42, the resistor 56 and the potentiometer 58, with the modulation frequency components of the I.F. wave being developed across the resistors 56 and 58. An AGC voltage for the receiver is derived at the junction of the resistors 56 and 58, and is applied through a suitable filter network including a series resistor 64 and a shunt capacitor 68 to the control grids of the converter stage 16 and the intermediate frequency amplifier stage 38.

The detected audio frequency signals appearing across the potentiometer 58 are coupled by way of a capacitor 68 to the control grid 48 of the audio amplifier portion of the tube 44. A potential which is sufficiently negative to maintain the audio amplifier cut-off is derived from the oscillator grid 22 of the converter tube 16 and is applied to the control grid 48 through resistors 69 and 70. However, as will hereinafter be described, upon reception of a keying signal, the bias to the audio amplifier is reduced to permit normal operation thereof. The amplified audio signal may then be applied to a conventional audio power amplifier 72 which is coupled to drive a loudspeaker 74.

As mentioned above, the audio amplifier is normally blocked by a negative bias applied to the grid 48 in the absence of a keying signal. The keying signal may comprise a signal modulating the sound carrier. The keying signal is preferably low enough in frequency and small enough in amplitude (about 10% modulation) so as to be inaudible on conventional receivers. By way of example, the keying signal may comprise a 30 cycle note.

To utilize the keying signal, a portion of the detected signal developed across the potentiometer 58 is also applied to a keying tone amplifier which selectively amplifies the keying signal frequency. To this end a voltage divider including a pair of resistors 78 and 80 are connected in parallel with the potentiometer 58. To prevent the receiver from being actuated by spurious noise signals and the like, the resistor 80 is shunted by a filtering network including the capacitor 82, and the series combination of a resistor 84 and a capacitor 86. Signals developed across the capacitor 86 are coupled to the control electrode 88 of the keying tone amplifier stage 76 by way of the resistor 90 and capacitor 92.

The amplified keying tone signal is coupled from the anode of the amplifier stage 76 to the cathode of a second keying tone amplifier stage 93 through a capacitor 94. The amplifier stage 93 operates as a grounded grid amplifier with the grid directly connected to ground and the cathode connected to ground through an input resistor 95. To provide the necessary selectivity for the 30 cycle per second keying tone, a parallel T feedback circuit tuned to a null at 30 cycles is connected between the anode of the amplifier stage 93 and the control electrode of the amplifier stage 76. The feedback circuit which comprises the resistors 96, 97, 98 and 100 and the capacitors 102, 104 and 106 produces substantially no feedback at the frequency of the keying signal, but a substantial degenerative feedback for signals of other frequencies.

The output signal from the keying tone amplifier stage 93 is then primarily the keying tone which is then applied to a third keying tone amplifier stage 108 for amplification prior to application to a control amplifier tube 110. An automatic gain control voltage derived across the resistor 58 is applied to the control electrode of the amplifier stage 108 through the filter network including the resistors 111 and 112 and the capacitor 113. This provides the necessary gain reduction to prevent spurious keying of the circuit by the low frequency modulation of strong signals.

The control amplifier 110 is normally operated with zero grid bias thereby establishing a high plate current and a resulting low plate voltage on the order of 7 volts. When an amplified keying signal is fed to the grid of the control tube 110, grid rectification occurs causing the plate voltage to swing more positive in half wave pulses. The pulsating D.C. voltage is filtered by the resistor 114 and the capacitor 115 yielding a positive D.C. voltage on the order of 55 volts.

In the operation of the alert receiver of the invention, the usual on-off switch such as the switch 116 is moved to a position to supply an operating supply voltage to the receiver. By moving the Manual-Alert switch 118 which is shown in the Alert position to the Manual position, the negative bias which is applied to the audio amplifier is materially reduced by the resistors 119 and 120 so that the receiver then operates as a conventional broadcast receiver. By unicontrol adjustment of the signal selection and oscillator tuning circuits, a desired station may be selected. For Alert operation, the Manual-Alert switch 118 is returned to the Alert position, and in the absence of the keying signal the signal channel is blocked by the negative bias applied to the control electrode 48 of the audio amplifier.

It will be seen that the negative bias referred to is derived from a voltage divider comprising the resistors 69 and 114 which are serially connected between the oscillator grid 22 of the converter tube 16, and the plate of the control amplifier 110. The audio amplifier control grid is connected to the junction of the voltage divider resistors by the resistor 70. In the absence of a keying signal, the control grid 22 is at a potential of about −10 volts, and the potential at the plate of the control tube 110 is at about +7 volts. The relative values of the resistors 69 and 114 are selected so that a voltage of about −6 volts appears at the junction thereof, which is sufficient to cut-off the audio amplifier stage.

Upon reception of a keying signal, the plate voltage of the keying tube rises to about +55 volts, thereby changing the potential distribution along the voltage divider, and raising the potential at the junction of the resistors 69 and 114 to a level to permit normal amplification in the audio amplifier. However, if this potential should become too positive, the operating conditions of the audio amplifier would be such as to produce distortion. Accordingly, the junction of the resistors 69 and 114 is clamped to ground for positive potentials by a connection to the anode 54 of one of the rectifier portions 54—48 of the tube 44. Accordingly, this junction can become no more positive than ground potential.

With the receiver energized and in the Alert position, there is normally no sound output. However, important news bulletins and the like can be heard when a keying signal is impressed on the carrier at the transmitter. At the termination of the bulletin the keying signal is also terminated, and the receiver returns to the stand-by condition. In this manner, the public can be immediately informed of recent developments without the necessity of having continuous sound output from the receiver.

What is claimed is:

1. An alert radio signal receiver comprising in combination, a converter stage having a signal input circuit and an oscillator circuit for converting a received signal modulated carrier wave to a corresponding wave of intermediate frequency, said converter stage providing a point of negative potential with respect to ground for the receiver, a detector for recovering the modulation components of said carrier wave coupled to said converter stage, an audio frequency amplifier having a control electrode coupled to said detector stage for amplifying said modulation components, a signal-responsive control circuit connected with said detector including a normally conductive control amplifier device having a point of positive potential with respect to said ground, a voltage divider comprising a pair of resistors serially connected between said point of negative potential and said converter stage and said point of positive potential in said control amplifier device, said resistors being proportioned to provide a voltage at the junction thereof which is sufficiently negative to maintain said audio amplifier ineffective for the amplification of said modulation components, means direct-current-conductively connecting the junction of said resistors to the control electrode of said audio-frequency amplifier, and means in said control circuit responsive to a predetermined keying signal for changing the current in said control amplifier device to increase the potential at said point therein in a positive direction sufficient to render the voltage at the junction of said first and second resistors effective to permit said audio amplifier to amplify said modulation components, and unidirectionally conductive means connected between the junction of said first and second resistors and ground for said receiver to prevent the voltage at said junction from becoming of an amplitude to produce distortion in said audio-frequency amplifier.

2. An alert radio signal receiver comprising in combination, a converter stage having a signal input circuit and an oscillator circuit for converting a received signal modulated carrier wave to a corresponding wave of intermediate frequency, said converter stage providing a direct-current voltage of a first magnitude with respect to receiver ground, a detector stage for recovering the modulation components of said carrier wave coupled to said converter stage, an audio-frequency amplifier coupled to said detector stage for amplifying said modulation components, a signal-responsive control circuit connected with said detector for providing a direct-current voltage of a second magnitude with respect to said ground, one of said direct-current voltages being negative with respect to said ground a voltage divider comprising a pair of resistors serially connected between said converter stage and said control circuit to receive said voltage of said first magnitude and said voltage of said second magnitude respectively from said converter stage and said control circuit, means direct-current-conductively connecting the junction of said resistors to said audio-frequency amplifier to apply gain controlling bias potential thereto with respect to said ground, said resistors being proportioned to provide a resultant bias voltage at the junction thereof which is of a magnitude to maintain said audio amplifier ineffective to amplify said modulation components, and means in said control circuit responsive to a predetermined keying signal for changing the voltage provided by said control circuit to a third magnitude sufficient to change the bias voltage at the junction of said first and second resistors to a magnitude effective to enable said audio amplifier to amplify said modulation components.

3. An alert radio signal receiver comprising in combination, a converter stage having a signal input circuit and an oscillator circuit for converting a received signal modulated carrier wave to a corresponding wave of intermediate frequency, said converter stage providing a direct-current voltage of a first magnitude with respect to ground for said receiver, a detector coupled to said converter stage, an amplifier stage in said receiver coupled to said detector stage and having a gain-control electrode, a signal-responsive control circuit connected with said detector for providing a direct-current voltage of a second magnitude with respect to said ground, one of said direct-current voltages being negative with respect to said ground, a voltage divider comprising a pair of resistors serially connected between said converter stage and said control circuit to receive said voltage of said first magnitude and said voltage of said second magnitude respectively from said converter stage and said control circuit, means direct current conductively connecting the junction of said resistors to said gain-control electrode of said amplifier stage, said resistors being proportioned to provide a bias voltage at the junction thereof which is sufficiently negative to maintain said amplifier ineffective for normal amplification, and means in said control circuit responsive to a predetermined keying signal for changing the voltage provided by said control circuit to a third magnitude sufficient to change the bias voltage at the junction of said first and second resistors to a magnitude effective to restore said amplifier stage for normal amplification.

References Cited in the file of this patent

UNITED STATES PATENTS

| | | |
|---|---|---|
| 2,055,164 | Wichman | Sept. 22, 1936 |
| 2,096,874 | Beers | Oct. 16, 1937 |
| 2,250,596 | Mountjoy | July 29, 1941 |
| 2,344,618 | Koch | Mar. 21, 1944 |
| 2,367,327 | Beers | Jan. 16, 1945 |
| 2,392,672 | Koch | Jan. 2, 1946 |
| 2,531,416 | Ferrar | Nov. 28, 1950 |